Sept. 7, 1926.
C. G. SMITH
FLUID CONTROL APPARATUS
Original Filed Jan. 8, 1918
1,598,752
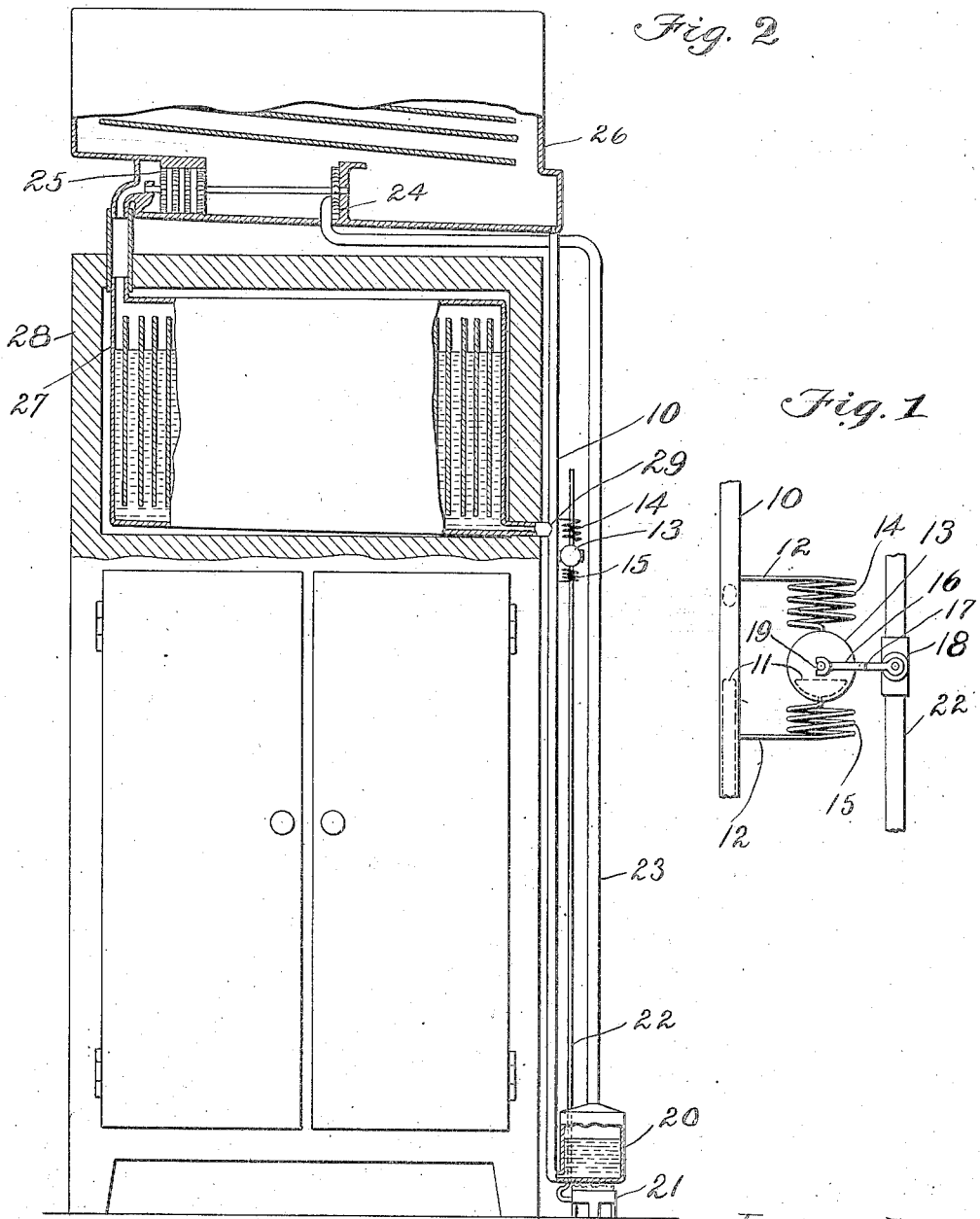

Patented Sept. 7, 1926.

1,598,752

UNITED STATES PATENT OFFICE.

CHARLES G. SMITH, OF MEDFORD, MASSACHUSETTS, ASSIGNOR TO RAYTHEON MANUFACTURING COMPANY, OF CAMBRIDGE, MASSACHUSETTS, A CORPORATION OF MASSACHUSETTS.

FLUID-CONTROL APPARATUS.

Original application filed January 8, 1918, Serial No. 210,841. Divided and this application filed January 10, 1924. Serial No. 685,490.

My invention relates to fluid controlled apparatus for producing an indication or for controlling the operation of other apparatus.

This application is a division of my application S. N. 210,841, filed Jan. 8, 1918, and patented Mar. 11, 1924, Patent No. 1,486,551.

Heretofore, floats, pistons, diaphragms, bellows, Bourdon tubes, and similar devices have been used in contact with a fluid to produce an indication, or to control other apparatus in accordance with changes in the pressure, level, or other characteristic or condition of a fluid. There are many objections to these devices owing to complications in their manufacture, difficulties in securing materials having suitable mechanical or physical properties for use in the devices, and difficulties in maintaining positive and satisfactory operation of these devices during long periods of usage in connection with certain fluids. These difficulties are especially pronounced when the fluid being used is highly corrosive or active chemically; when the fluid is highly solvent; when it must be retained hermetically sealed within its container because of its intrinsic value or its poisonous or other harmful qualities, as in the case of mercury; when the fluid tends to produce a deposit on the surfaces to which it is exposed; when the fluid is employed at high temperature or high pressure; or where thin walls or seams in the walls are not permissible.

Floats and pistons, as ordinarily constructed with parts involving sliding surfaces, afford leakage for the fluid between the sliding surfaces. Furthermore, these parts are not easily constructed and when in operation easily get out of order owing to wear, fouling, corrosion, or failure of the parts in contact with the fluid.

Diaphragms, bellows, Bourdon tubes and the like are objectionable in that they require the use of relatively thin special elastic materials of very limited physical and chemical resistance to the action of fluids and, when operating, involve large specific deformations of the material of which they are made, whereby their operation is seriously disturbed by the presence of surface deposits from the fluid or changes in the material brought about by the fluid. These devices in their simpler forms provide only small physical displacements between the upper and lower limits of their respective operating ranges and are thus inherently limited in their utility.

Objects of my invention are to overcome the above difficulties; to provide fluid controlled apparatus of the kind referred to, constructable from readily available material, providing a relatively large physical displacement between its upper and lower operating limits, not subject to wear or getting out of order easily, and particularly suited for use in connection with highly active or solvent fluids, fluids tending to quickly foul the surface with which they contact, fluids at high temperatures or high pressures, or fluids which require special precautions to prevent leakage; to provide apparatus for automatically controlling the pressure or the level of a fluid, or for automatically controlling the pressure in a boiler particularly when dense liquids, such as mercury, are employed; and generally to improve apparatus of the kind referred to.

In one aspect of my invention fluid controlled apparatus is provided in which a fluid container is yieldingly supported by elastic means having a path for the passage of the fluid to or from the container, so that changes in the weight of fluid therein upon the passage of fluid over the path produce corresponding vertical displacements of the container to provide a visual indication or to control other apparatus.

In another aspect my invention contemplates employing fluid responsive apparatus including an elastically supported fluid container in connection with an upright conduit or reservoir, whereby changes of fluid pressure or level therein produce corresponding movements in the fluid responsive apparatus, the fluid responsive apparatus in turn regulating the pressure or level of the fluid. This arrangement employing a boiler utilizes the boiler pressure to support the fluid in the conduit or reservoir, the fluid responsive apparatus varying the rate at which heat is supplied to the boiler, thus tending to maintain constant pressure in the boiler and constant pressure or level of fluid in the conduit or reservoir.

The invention will be explained in the following description in connection with the appended drawing, in which:

Fig. 1 is an elevation illustrating a form of fluid control apparatus; and

Fig. 2 is an elevation, partly in section, of regulating apparatus for a refrigerator employing the apparatus of Fig. 1.

In Fig. 1, the upright conduit or reservoir 10 adapted to contain a liquid or other fluid, the level of which is indicated by dotted lines 11, supports the ends of flexible conduit 12 opening into conduit 10 and extending substantially horizontally therefrom. The enlarged portion or vessel 13 in conduit 12 is supported between the helical coils or circuitously directed sections 14, 15 of the conduit, the upper part of the vessel being connected with section 14 and the lower part being connected with section 15.

The conduit sections 14 and 15 may be looked upon as being a pair of conduits, one end of each being supported by conduit 10, their other ends projecting freely in a substantially horizontal direction and joined together by vessel 13 supported therefrom. It will be noted that the vessel 13, together with the fluid therein, is supported with its center of gravity horizontally displaced with respect to the points of attachment of the extremities of the conduit sections to the conduit 10.

The weight of conduit 12 including vessel 13 and the weight of fluid therein compresses and deflects downward the lower section 15, and stretches and deflects downward the upper section 14 of conduit 12. When the level 11 of the fluid in the conduit 12 varies, or the pressure of fluid at the lower end of the conduit varies, or the density of fluid in the conduit varies, the resulting variation in weight produces corresponding vertical deflections and displacements in the conduit, thus providing a visible response, or a force to operate other apparatus.

While the conduit or reservoir 10 is disposed in a substantially upright position when responses are to be produced by changes in the level, pressure, or density of a fluid, such disposition is obviously unnecessary when responses are to be produced by variations in the density of a fluid circulating through the conduit.

The bifurcated end 16 of lever 17 of valve 18 of well known construction, straddles the vessel 13, the slotted ends of the arms 16 being loosely engaged by pins or bosses 19 projecting from opposite ends of a horizontal diameter of vessel 13. When vessel 13 is displaced vertically the lever 17 is angularly displaced to control the flow of fluid through valve 18.

The refrigerating apparatus illustrated in Fig. 2 derives its operating energy from the boiler 20 which is adapted to contain a liquid of high density, preferably mercury. The boiler is heated by the burner 21, supplied with fuel through the pipe 22. The mercury vapor is discharged through pipe 23 to drive the turbine 24 which in turn drives the pump 25, the vapor exhausting from turbine 24 into condenser 26, the walls of which are exposed in contact with air or other cooling fluid. The condensed mercury collects in the base of the condenser, discharging into conduit 10, and accumulating in the lower portion of the conduit from which it returns to the boiler 20 below the level of liquid mercury therein. Pump 25 propels vapor of the liquid refrigerant from the evaporator 27 to the condenser 26, thus cooling the evaporator and the interior of the refrigerator 28. The refrigerant which may be water condenses in condenser 26 and passes into conduit 10, accumulating in the conduit above the liquid mercury therein, and returning to the evaporator 27, the level of the mercury in conduit 10 being below the outlet 29 in the conduit 10 through which the water discharges into the evaporator.

The fluid responsive apparatus shown in Fig. 1 is applied to the refrigerating apparatus by connecting the conduit section 14 to conduit 10 above the level of the mercury and connecting the conduit section 15 to conduit 10 below the level of the mercury, the valve 16 (Fig. 1) controlling the flow of fuel through conduit 22.

When operating the refrigerating apparatus, the pressure of mercury vapor in boiler 20 forces liquid mercury into conduit 10 where it is supported as a column, the effective head of which is in equilibrium with the fluid pressure above the mercury column in conduit 10 and above the level of mercury in boiler 20. As the pressure in the boiler increases the level 11 of the mercury rises until the increased weight of mercury in conduit 12 and vessel 13 angularly displaces the arm 17 and reduces the supply of fuel to burner 21, thereby reducing the heat supplied to boiler 20, thus reducing and regulating the pressure in boiler 20 and the pressure and level of mercury in conduits 10 and 12.

The design of the fluid controlled apparatus 13, 14, 15 is such as to lend itself to construction as a seamless conduit, the parts of which may be welded together or otherwise integrally connected so as to provide sealed walls which prevent escape of the fluid enclosed therein. The walls of conduit 12 may be made as thick as desired to withstand high pressure or to provide increased resistance to pressure when the material utilized is chosen because of its temperature resisting qualities and possesses relatively small resistance to fluid pressure. Similarly the material of these walls may be selected because of its resistance to active fluids and may require correspondingly thick walls to compensate for weakness of the particular kind of material chosen. The length of conduit 12 may be extended in order to provide the desired flexibility, and the specific deformation of the material may be made as small as desired by this expedient so that material having relatively slight elasticity is suitable.

It will be noted that the fluid responsive apparatus described involves no relatively sliding parts in contact with the fluid and, owing to its length, requires only a small deformation of the material used to provide the desired displacement. By increasing the volume of conduit 12, including the vessel 13, the change of weight within the conduit may be increased for a given change of level of the fluid, and a force of any desired value may thus be obtained to produce a deflection of the desired value and to operate other apparatus.

I claim:

1. The combination with a liquid heater and vaporizer, of means for controlling the pressure therein, including means operative on adjustment to effect a variation in such pressure, and controlling means for said last mentioned means including a vessel for containing fluid, and means providing a path for the flow of fluid to and from said vessel, said last mentioned means elastically supporting said vessel, whereby said vessel is vertically displaced in response to variations of the weight of fluid therein upon the passage of fluid over said path.

2. The combination with a liquid heater and vaporizer, of means for controlling the pressure therein, including means operative on adjustment to effect a variation in such pressure, and controlling means for said last mentioned means including a vessel for containing fluid, and an elastic conduit opening into and supporting said vessel, when in operative position, in vertically yieldable relation with respect to a portion of the conduit remote from said vessel.

3. The combination with a liquid heater and vaporizer, of means for controlling the pressure therein, including means operative on adjustment to effect a variation in such pressure, and controlling means for said last mentioned means including a vessel for containing fluid and a pair of elastic conduits opening into and supporting said vessel, when in operative position, in vertically yieldable relation with respect to the ends of said conduit remote from said vessel.

4. The combination with a liquid heater and vaporizer, of means for controlling the pressure therein, including means operative on adjustment to effect a variation in such pressure, and controlling means for said last mentioned means including a vessel for containing variable weights of fluid and a pair of circuitously directed elastic conduits opening into and supporting said vessel, when in operative position, in vertical yieldable relation with respect to the ends of said conduit remote from said vessel.

5. The combination with a liquid heater and vaporizer, of means for controlling the pressure therein, including means operative on adjustment to effect a variation in such pressure, and controlling means for said last mentioned means including a vessel for containing variable weights of fluid and a pair of coiled elastic conduits opening into and supporting said vessel, when in operative position, in vertical yieldable relation with respect to the ends of said conduits remote from said vessel.

6. The combination with a liquid heater and vaporizer, of means for controlling the pressure therein, including means operative on adjustment to effect a variation in such pressure, and controlling means for said last mentioned means including a vessel for containing variable weights of fluid and a pair of circuitously directed elastic conduits connected respectively to upper and lower portions of said vessel for supporting said vessel in vertically yieldable relation with respect to the ends of said conduits remote from said vessel.

7. The combination with a liquid heater and vaporizer, of means for controlling the pressure therein, including means operative on adjustment to effect a variation in such pressure and controlling means for said last mentioned means including a reservoir for containing a column of liquid, a conduit opening at one end into said reservoir above the level of the liquid therein and opening at its other end into said reservoir below said level, said conduit having flexible portions projected in directions having a horizontal component whereby liquid variably accumulating in said portions with change of liquid level therein produces a corresponding variable vertical displacement of said portions.

8. The combination with a liquid heater and vaporizer, of means for controlling the pressure therein, including means operative on adjustment to effect a variation in such pressure and controlling means for said last mentioned means including a reservoir for containing a column of liquid, a conduit opening at one end into said reservoir above the level of the liquid therein and opening at its other end into said reservoir below said level, said conduit having flexible portions projected in directions having a horizontal component, and an enlarged section in said conduit between said portions whereby liquid variably accumulating in said section with change of liquid level therein produces a corresponding vertical displacement of said section.

9. The combination with a liquid heater and vaporizer, of means for controlling the pressure therein, including means operative on adjustment to effect a variation in such pressure and controlling means for said last mentioned means including a reservoir for containing a column of liquid, a pair of flexible conduits connected to said reservoir, one opening into said reservoir above the level of the liquid therein, and the other opening into said reservoir below said level, each of said conduits having a horizontally projected free end, and a vessel supported from and connecting the free ends of said conduit whereby said vessel is vertically displaced in accordance with the level of liquid therein.

10. A device responsive to changes of fluid pressure, said device having a vessel for containing liquid the level of which is adapted to be varied in accordance with changes in fluid pressure, and a flexible conduit supporting said vessel and opening into the base thereof to transmit changes in the level of the liquid in said vessel, the center of gravity of said vessel and the liquid therein, when in operative position, being horizontally displaced with respect to a portion of said conduit remote from said vessel, whereby change of weight of liquid in said vessel with change of fluid pressure causes vertical displacement of said vessel with respect to said remote portion.

11. Fluid controlled apparatus having a support, a flexible conduit secured at each end to said support and projecting freely from said support in a direction having a horizontal component whereby parts of said conduit remote from said support are substantially displaced in a vertical direction in response to variations of the weight of fluid therein, and means actuated by vertical displacement of said conduit for controlling the weight of fluid therein.

12. Fluid controlled apparatus having a vessel containing fluid, means providing a path for the flow of fluid to and from said vessel and for elastically supporting said vessel whereby said vessel is vertically displaced in response to variations of the weight of fluid therein, and means actuated by vertical displacement of said vessel for controlling the weight of fluid therein.

13. In a fluid pressure regulator, a boiler, means for supplying fuel thereto, a conduit opening into said boiler, said conduit having an upright portion for containing a liquid, and means actuated in response to changes of liquid level in the upright portion of said conduit with changes of boiler pressure for controlling said fuel supply means.

14. In a fluid pressure regulator, a boiler, means for supplying heat thereto, a conduit opening into said boiler, said conduit having an upright portion for containing a liquid, said upright portion leading to a substantial horizontally extending elastic portion having a free end, a vessel supported by said free end and opening thereinto, whereby said vessel is vertically displaced in accordance with change of liquid level in said vessel with changes of pressure in said boiler, and means whereby said heat supply means is controlled by vertical displacement of said vessel.

15. The combination with a liquid heater and vaporizor provided with means for supplying fuel thereto of means for controlling the pressure therein, including means operative on adjustment to control the fuel supply thereto and controlling means for said last mentioned means including a vessel for containing fluid, and elements providing a path for the flow of fluid to and from said vessel and for elastically supporting said vessel, whereby said vessel is vertically displaced in response to variations of the weight of fluid therein upon the passage of fluid over said path.

16. In combination with a receptacle containing a liquid and a gaseous fluid, means for regulating the pressure of said gaseous fluid including a receptacle in free communication at its lower end with said liquid, and movable in proportion to the liquid level therein, and means governed by the movement of said second mentioned receptacle for controlling the pressure of said gaseous fluid.

17. In combination with a receptacle containing a liquid and a gaseous fluid, means for regulating the pressure of said gaseous fluid including a receptacle in free communication at its lower end with said liquid, and at its upper end with a space in which the pressure is below the pressure in said first mentioned receptacle, said second mentioned receptacle being movable in proportion to the liquid level therein, and means governed by the movement of said second mentioned receptacle for controlling the pressure of said gaseous fluid.

18. In combination with a receptacle containing a liquid and a gaseous fluid, means for regulating the pressure of said gaseous fluid including a receptacle in free communication at its lower end with said liquid through a combined fluid conducting tube and resilient support therefor, said second mentioned receptacle being movable in proportion to the liquid level therein, and means governed by the movement of said second mentioned receptacle for controlling the pressure of said gaseous fluid.

19. In combination with a receptacle containing a liquid and a gaseous fluid, means for regulating the pressure of said gaseous fluid including a receptacle in free communication through combined fluid conducting tubes and resilient supports therefor with said liquid, and with a space wherein the pressure is less than the pressure in said first mentioned receptacle, said second mentioned receptacle being movable in proportion to the liquid level therein, and means governed by the movement of said second mentioned receptacle for controlling the pressure of said gaseous fluid.

20. In combination with a receptacle containing a liquid and a gaseous fluid, means for controlling the pressure of said gaseous fluid including a column communication with said receptacle below the liquid level therein, means connected in liquid circuit with said column and altering its position in accordance with variations in liquid level in said column, and means actuated thereby for regulating the pressure of said gaseous fluid.

21. In combination with a receptacle containing a liquid and a gaseous fluid produced by the vaporization of said liquid, means for controlling the pressure of said gaseous fluid, including a column communicating with said receptacle below the liquid level therein, means connected in liquid circuit with said column and altering its position in accordance with variations in the liquid level in said column, and means actuated thereby for regulating the pressure of said gaseous fluid.

22. In combination with a receptacle containing a liquid and a gaseous fluid, means for controlling the pressure of said gaseous fluid including a column communicating with said receptacle below the liquid therein, a vessel connected adjacent the top and bottom thereof with spaced points in said column, and altering its position in accordance with variations in the liquid level in said column, and means actuated thereby for regulating the pressure of said gaseous fluid.

23. In combination with a receptacle containing a liquid and a gaseous fluid, means for controlling the pressure of said gaseous fluid including a column communicating with said receptacle below the liquid level therein, a vessel connected at its top and bottom respectively, with spaced points in said column disposed at opposite sides of the liquid level in said column when the gaseous fluid pressure in said receptacle is at the desired point; said vessel altering its position in accordance with variations in the liquid level in said column, and means actuated thereby for regulating the pressure of said gaseous fluid.

24. The combination with a liquid container, of means for controlling the liquid level therein including means adjustable to effect a variation in liquid level in said container, and controlling means therefor including a vessel for containing liquid, an operative connection between the same and said adjustable means, and means providing a path for the flow of fluid to and from said vessel with respect to said container and constituting elastic supporting means for said vessel, whereby said vessel is vertically displaced in response to variations in the weight of fluid therein upon the passage of fluid over said path in accordance with fluctuations in liquid level in said liquid container.

25. The combination with a liquid container, of means for controlling the liquid level therein including means adjustable to effect a variation in liquid level in said container, and controlling means therefor including a vessel for containing liquid, an operative connection between the same and said adjustable means, and means providing a plurality of paths for the flow of fluid to and from said vessel with respect to said container and constituting elastic supporting means for said vessel, whereby said vessel is vertically displaced in response to variations in the weight of fluid therein upon the passage of fluid over one of said paths in accordance with fluctuations in liquid level in said liquid container.

Signed by me at Cambridge, Massachusetts, this 7th day of January, 1924.

CHARLES G. SMITH.